Feb. 14, 1961 H. P. KALLMANN ET AL 2,972,082

DATA STORAGE METHOD AND APPARATUS

Filed Feb. 14, 1955 3 Sheets-Sheet 1

INVENTORS
HARTMUT KALLMANN
BARNETT ROSENBERG
BY
Curtis, Morris & Safford
ATTORNEYS INVENTORS
HARTMUT KALLMANN
BARNETT ROSENBERG
BY
Curtis, Morris & Safford
ATTORNEYS Feb. 14, 1961 H. P. KALLMANN ET AL 2,972,082

DATA STORAGE METHOD AND APPARATUS

Filed Feb. 14, 1955 3 Sheets-Sheet 3

INVENTORS
HARTMUT KALLMANN
BARNETT ROSENBERG
BY
Curtis, Morris & Safford
ATTORNEYS United States Patent Office 2,972,082

Patented Feb. 14, 1961

2,972,082

DATA STORAGE METHOD AND APPARATUS

Hartmut P. Kallmann, Flushing, and Barnett Rosenberg, New York, N.Y., assignors to Research Corporation, New York, N.Y., a corporation of New York Filed Feb. 14, 1955, Ser. No. 487,889

9 Claims. (Cl. 315—10)

This invention relates to methods and apparatus for recording, storing and recalling data of any type by means of changes in characteristics brought about as a result of the persistent internal polarization of certain photoconductive materials which exhibit a high resistance in the absence of irradiation by energy in some form, and by means of changes in the "latent" internal polarization of such materials which can be later converted into persistent internal polarization at any time desired, or by means of changes in the "latent" internal polarizability alone.

The advent of electronic computing machines and of control apparatus used in the now rapidly expanding field of "automation," that is, the automatic production of many kinds of products has created a pressing need for methods and apparatus for rapidly, accurately recording and storing of large quantities of numerical data and other information of all kinds and for making the stored data and information available for practically instantaneous recall for use in subsequent operations of the computers or automatic apparatus. Depending on the particular circumstances, it may be necessary to record the data or information and have it available for recall almost immediately, or it may be desirable to store the recorded information for considerable periods of time without any danger that the signal representative of the recorded data will deteriorate beyond a level permitting accurate recall.

Among the advantages of the present invention are those resulting from the fact that it enables the preservation and storage of information over long periods of time, if desired, and its rapid, accurate recall, whenever desired.

Other advantages of the methods and apparatus described herein are those resulting from the fact that the stored information can be recalled a number of times at successively later periods of time. The storage and recall of the information is obtained without the use of mechanically moving parts, thus avoiding the inherent limitations of mechanical operation, and without the use of magnetizable material, thus avoiding the problems of magnetic hysteresis.

The methods and apparatus described herein are entirely different in concept, arrangement, and operation from the types of systems wherein data is stored by building up electrostatic charges on the surfaces of insulating materials.

In the method and apparatus of the present invention, we utilize phenomena which have long been considered a serious obstacle to the most efficient operation of many kinds of photoelectric apparatus, an obstacle which has received much attention in an effort to overcome the limitations it imposes. We provide new and extremely efficient methods and apparatus by which appropriately coded data may be electrically recorded and recalled, and the electrically recorded data is capable of preservation for long periods of time prior to its recall without deterioration.

We have found, after considerable research, that the phenomena of persistent internal polarization in a broad class of photoconductive substances having a high dark resistance, described in detail below, is accurately controllable and reproducible. By controlling the intensity of the persistent internal polarization in a predetermined relation to suitable characteristics of items of data to be recorded, the characteristics are preserved in the form of variations in the degree of persistent internal polarization occurring from point to point internally of the substance. Subsequently, this varying polarization may be recalled or detected by any one of several ways as described and the recorded characteristics of the items of data are thus reproduced. Both the recording and the recall may be carried on at suitably high speeds and with a high degree of accuracy, as explained in detail hereinafter.

Instead of storing the items of data directly in the form of variations in the degree of persistent internal polarization, the items may be as quickly and easily stored in the form of variations in which we call "latent" internal polarizability. This latent polarizability is not truly polarization in the sense of having an electric field associated with the internally stored charges, but it is convenient to thick of it in these terms because it is converted into true persistent internal polarization before the information is recalled or "read out." This conversion is quick and easy and may advantageously be made immediately prior to the recall, practically simultaneously therewith. An advantage of the use of the latent polarization effects is that the internally stored charges do not have any field associated with them until converted into persistent internal polarization. This method combines the advantages of fieldless storage plus having the polarization available at the time of recall. When the storage material is in the latent polarizable state, it can subsequently be polarized by the application of energy of a type or level which normally would not enable polarization to be produced, or in some cases can subsequently be "dark" polarized merely by the application of a unidirectional electric field alone, all as explained in detail hereinafter.

In the methods and apparatus described, we may utilize an extended layer of material comprising in part an internally polarizable substance, together with means for establishing a unidirectional electric field across the layer and which may be of substantially constant intensity or may be of varying intensity depending on the particular application or may be turned on and off at desired brief periods. A persistent internal polarization potential or a latent polarizability is then induced in such substance by irradiation of elemental areas of the layer in any desired sequence with a suitable beam of exciting radiation, described in detail below. Following this recording process, the persistent internal polarization established in such substance is preserved for extended periods of time by removing the applied field, preferably removing any surface charge, and then shielding such substance from external influences, principally from any incident radiation. The latent polarizability is preserved merely by shielding the substance from incident radiation. Recall of the recorded data is effected by sensing the degree of polarization in each elemental area of the layer in any desired sequence.

As used herein the term "variations in degree of internal polarization" is used in its broadest sense. For example, it is intended to include methods and apparatus wherein the data is stored in terms of gradations in intensity of persistent internal polarization as well as systems in which the information is stored in digital or yes-no form.

The various features, aspects, and advantages of the present invention will be more fully understood from the following description considered in conjunction with the accompanying drawings, in which.

Figure 1:
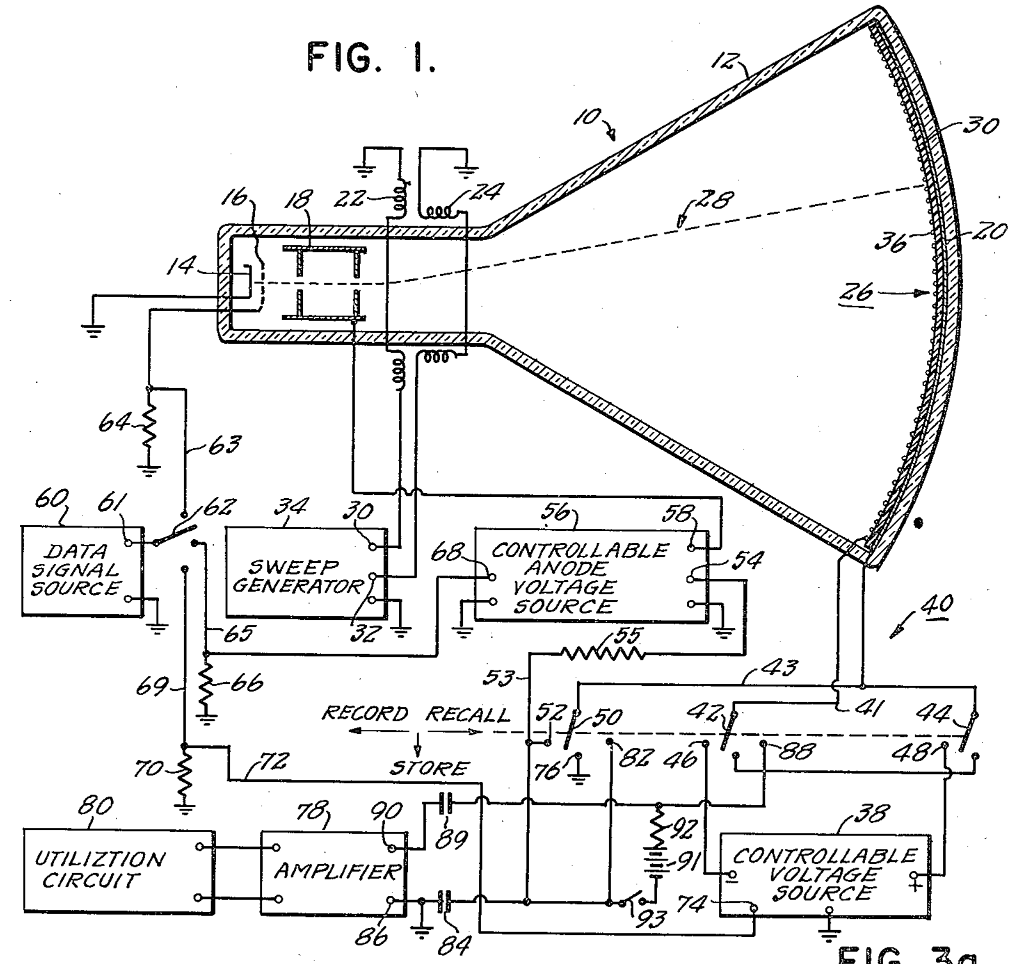
Figure 1 is a diagrammatic illustration, partially schematic, of data recording, storing, and recalling apparatus embodying the present invention.
Figures 3, 3A:
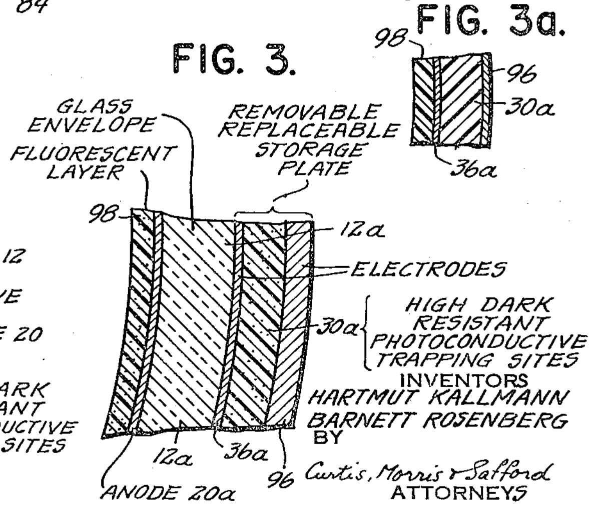
Figure 3 is a sectional view, on similar scale of a modified arrangement of the material.
Figure 4:
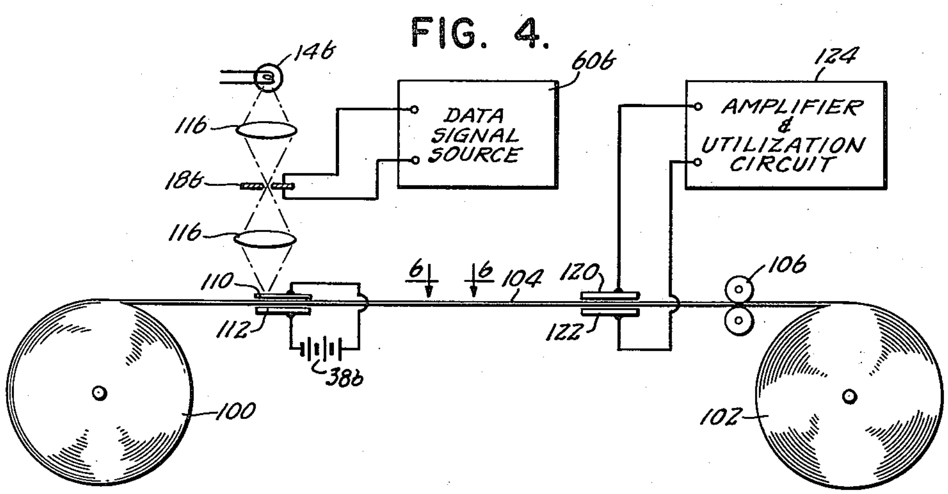
Figures 5, 6, 7:
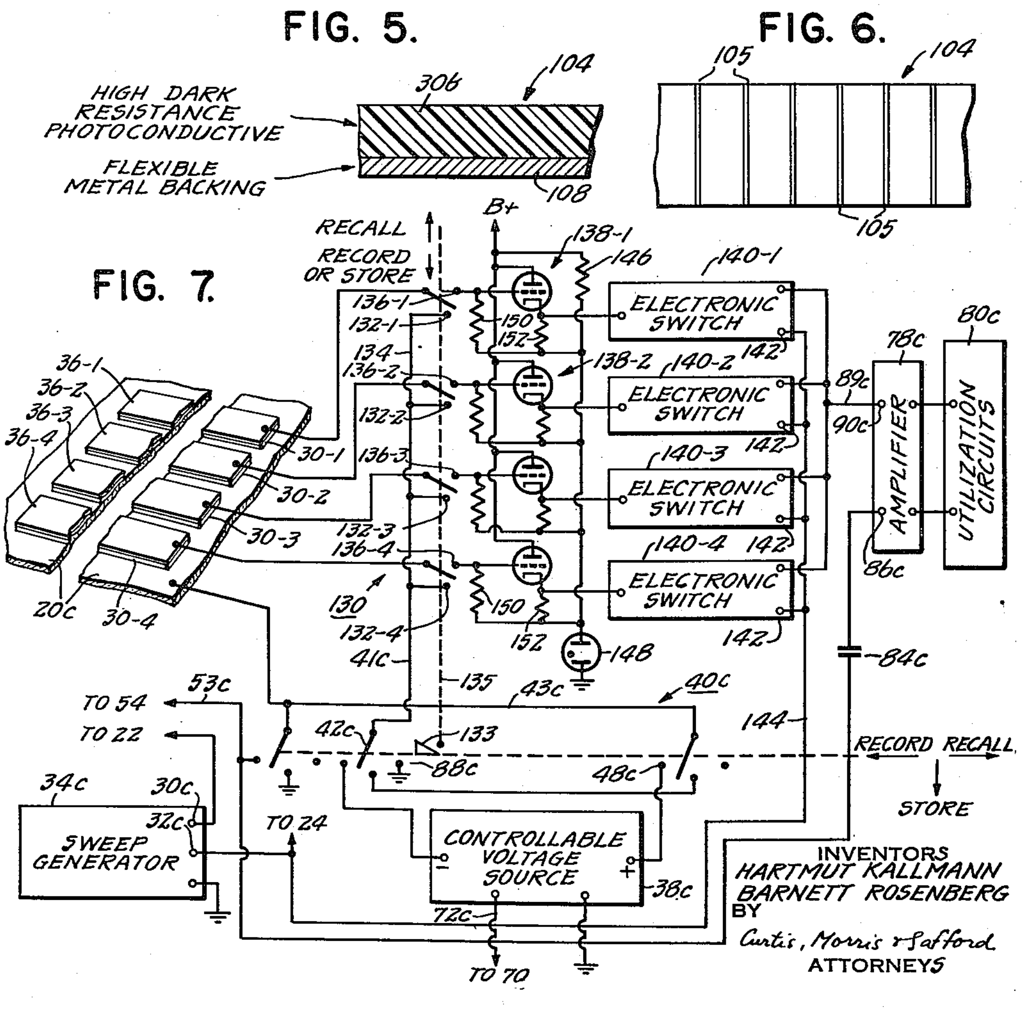
Figures 8, 9, 10, 11, 12:
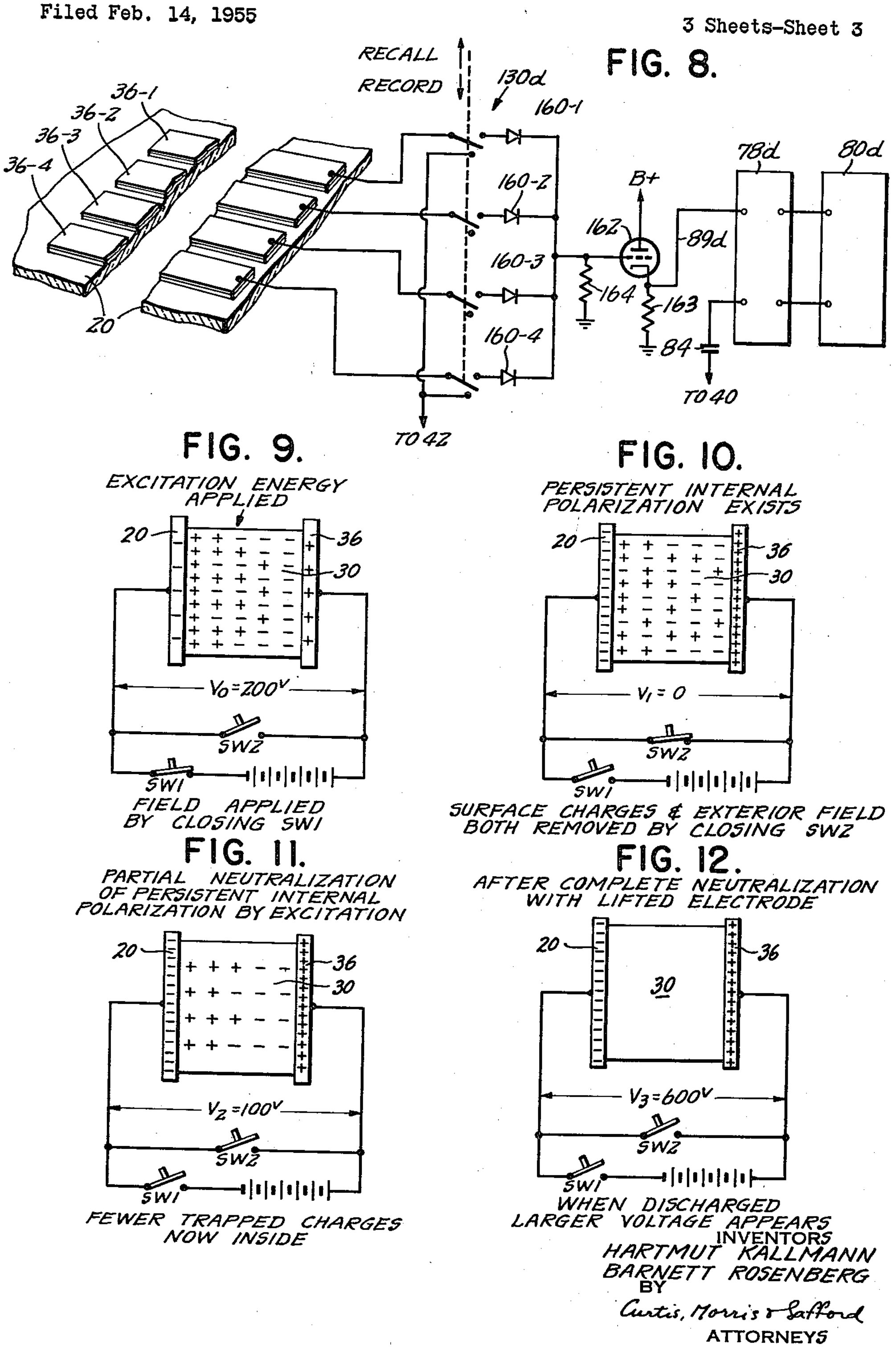

Figure 3*a* is a similar further modified arrangement;

Figure 4 is a diagrammatic illustration, partially schematic, of a modified form of data recording, storing, and recalling method and apparatus embodying the present invention;

Figure 5 is a sectional view, on enlarged scale showing a portion of the apparatus of Figure 4;

Figure 6 is another enlarged view of a portion of the apparatus of Figure 4;

Figures 7 and 8 are diagrammatic illustrations, partially schematic, of modified forms of data recording, storing, and recalling method and apparatus, each in certain respects similar to Figure 1; and Figures 9, 10, 11, and 12 are diagrammatic illustrations for purposes of further explanation.

The method of the present invention involves the recording of items of data by the irradiation by a suitable beam of energy of an extended layer or matrix of material susceptible of persistent internal polarization, and by the establishment in the layer of an electric field, either simultaneously with the radiation or subsequently. In the case of the use of latent polarizability, this field is established simultaneously with the irradiation of the material by a second beam of energy, preferably infrared, which sets free the stored charges and enables the transfer of the latent polarization into persistent internal polarization. Such internally polarizable material is generally characterized as having two characteristics: i.e. (1) mobile charges released therein as a result of excitation of the material, and (2) both positive and negative charges become localized in so-called "traps" or "trapping sites."

The material may be excited by irradiation by a beam of energy, i.e. exhibit photoconductivity. (As used herein the concepts of a beam of energy and photoconductivity are used in their broadest sense, as will be apparent from the definition of a beam of energy given below.) In certain instances the excitation may be by other forms of energy than impinging beams, e.g. by the application of a field, such as an electric field, e.g. as with electroluminescent materials.

In further explanation of the second of the two characteristics required in material for use in the method and apparatus described, i.e. the localizing of the charges in the material, it is necessary that the material have a so-called "high dark resistance." That is, in the absence of any excitation, substantially no mobile charges are present and in the absence of any excitation, substantially no mobile charges should be created in the material, or at least in the absence of any excitation, substantially no mobile charges are created. The traps or trapping sites are places within the body of the material where the mobile charges become trapped, for long periods of time, as explained in detail below.

Materials for use in the method and apparatus of the present invention are thus defined as having the following characteristics:

(1) Mobile charges are created within the body of the material as a result of excitation, e.g. by incident beam of energy, by applied field, i.e. a photo-conductive material (very broad denotation intended).

(2) Substantially no mobile charges are created within the body of the material in the absence of excitation, i.e. high "dark resistance."

(3) Both positive and negative charges can be localized within the body of material.

(4) There are traps or trapping sites for the mobile charges within the body of the material.

It should be noted that the dark resistance of materials increases as their temperature is lowered. Thus, the limitation "having a high dark resistance" impliedly means at the temperature of operation. Thus, zinc oxide, which has far too low a dark resistance at room temperature to exhibit any significant persistent internal polarization, does show significant persistent internal polarization at low temperatures of the order of that of liquid air.

As examples of materials within this class are:

Zinc-cadmium sulphides (activated phosphors): In any ratio
Zinc-cadmium selenides (activated phosphors): of Zn or Cd up
Zinc-cadmium tellurides (activated phosphors): to 100% of either
Alkaline earth sulfides
Organic photoconductive substances Specific examples which we have found to exhibit strong latent and persistent internal polarization are the zinc-cadmium sulphide phosphors (ZnS-CdS) and substantially pure anthracene, in the organic photoconductive group. A particularly good ZnS-CdS phosphor for use in the methods and apparatus described is sold commercially as du Pont 1508 phosphor. Using an approximate composition as follows, in terms of weight percent of elements, suitable phosphor is made:

| | Percent |
|---|---|
| Cd | 40.97 |
| Zn | 31.74 |
| Pb | .015 |
| Cu | .010 |
| Ag | .003 |
| Au | .0025 |
| Ni | .0005 |
| S | 27.26 |

Other suitable materials are discussed below.

In order to prepare a storage layer or matrix of ZnS-CdS phosphor for use in the method and apparatus described, the phosphor in crystal or powder form is intimately mixed with and substantially uniformly dispersed in a suitable base material. For example cellulose acetate type cement e.g. "Duco" cement dissolved in amyl acetate makes a suitable liquid in which to disperse the phosphor. And then it is spread on a sheet electrode and dried to form a layer having a substantially uniform thickness of less than 1 millimeter. For example, we find that a uniform thickness within the range from about .04 mm. to about .5 mm. is usually satisfactory. The thinner layers generally give a faster response with an excitation of given intensity.

In the preparation of a suitable anthracene layer, for example, crystals of anthracene are fused onto a sheet electrode to form a layer of uniform thickness in the range from about .04 mm. to about 15 mm. Evaporated thin films of these materials can be used also.

VARIOUS METHODS OF INFORMATION RECORDING, STORAGE AND RECALL UTILIZING PERSISTENT INTERNAL POLARIZATION

Where the items of data are to be stored directly in the form of variations in the degree of persistent internal polarization occurring from region to region in the storage layer, then preferably the electric field is established transversely of the layer of internally polarizable substance. Then successive elemental areas of the layer, preferably in a predetermined sequence, are excited by irradiation with a beam or beams of varying quantities of energy, by which we mean electromagnetic radiation, as broadly defined to include beams of various exciting particles. We have found that radiation of almost any type, for example, gamma rays, X-rays, ultra-violet radiation, visible and infra-red light, beta particles, alpha particles and electron or ion beams may be used to excite the storage layer to induce the persistent internal polarization.

The product of the quantity of exciting energy incident upon an elemental area and of the electric field therein determines the intensity of the persistent internal polarization (P.I.P.) established in that elemental area.

I. *Recording by constant electric field and varying excitation method*

According to one aspect of the method, the amount of energy incident upon each of the elemental areas of the layer is caused to have a proportional or other predetermined relation to a characteristic of the items of data to be recorded, and the applied electric field is held constant, thus creating the desired variations in the P.I.P. For example, the quantity of energy can be varied by changing the intensity of the incident beam, i.e. a change in quantity (method I A). Alternatively, the energy level of the beam is changed, e.g. by decreasing its wavelength, increasing particle speed (method I B).

II. *Recording by constant excitation and varying electric field method*

According to another aspect of the invention, the energy in the incident beam of energy is held constant and the strength of the applied electric field is varied during the scanning by the beam, as a function of the information to be stored, thus creating the desired variations in P.I.P.

It will be readily understood that if, for example, the characteristic of the item of data to be recorded is the magnitude of a numerical quantity, then either the amount of radiation incident upon an elemental area or the electric field applied to that area may be made proportional to the desired numerical magnitude.

III. *Recording by combinations of methods I and II*

Various combinations of methods I and II, that is, variations in applied electric field intensity and simultaneous varaitions in incident beam intensity advantageously can also be used for recording.

The items of data thus are recorded in the form of variations in the degree of P.I.P. existing from elemental area to elemental area in the layer. Thus, the items of data can also be recorded in terms of relative reduction in the degree of P.I.P. occurring from area to area as well as in terms of relative increases therein, or any other predetermined relation to any predetermined characteristics of the items of data being recorded.

Irradiation of the elemental areas of the storage layer while under the influence of an electric field completes the recording steps of these methods described above. The persistent internal polarization in the elemental areas of the storage layer may be preserved for extended periods of time by isolating the layer from incident energy.

In the absence of any incident energy, we find that the internal polarization persists even after the layer has been subjected to large electric fields in the reverse direction or alternating electric fields. The period during which the P.I.P. may be preserved is dependent to some extent upon the material used in the layer; however, in any event, it persists for a long time, of the order of months or more in many cases.

IV. *Recording by "dark" polarization*

In the "dark" polarization method of recording data in the form of persistent internal polarization, the storage layer is first excited by incident energy in some suitable form, e.g. visible light, X-rays. This causes the material of the storage layer to become photoconductive, i.e. mobile charges are created or induced. Then the incident energy is turned off. The layer is without excitation, i.e. "dark." Soon after the radiation is turned off a unidirectional electric field is applied, preferably through the layer. This moves the charges which still remain as a result of the immediately prior excitation to establish the desired P.I.P.

V. *Recording by "latent" polarizability*

In the latent polarization method of recording information, the storage layer is merely excited by a suitable energy beam without any field being applied. According to our present theory for explaining this method (which theory is explained in detail hereinafter), the excitation step creates mobile charges which become "trapped" randomly at "trapping sites" within the body of the material of the storage layer. The next step is the conversion of these randomly located trapped charges into charges which are distributed in a pattern such as to cause an electric field to exist within the body of the storage layer. In regions of the layer in which more excitation is applied, our theory holds that larger numbers of mobile charges become trapped. The information in the form of randomly trapped charges can be preserved for very long periods of time because advantageously no field is associated with the stored data.

The conversion from "latent" to true polarization is accomplished by applying a strong burst of infra-red radiation, which our theory explains as acting to liberate these randomly located trapped charges. An electric field is simultaneously applied to move the liberated charges into trapping sites in a pattern to cause an electric field to appear within the body of the storage layer. In regions in which originally larger numbers of mobile charges were trapped, correspondingly larger internal fields are established, i.e. the persistent internal polarization is correspondingly greater. It is usually most advantageous to convert from latent to true P.I.P just prior to recall.

Alternatively, the electric field can be applied after the burst of infra-red has ceased, i.e. in effect to use the so-called "dark" polarization method, except that here the mobile charges remaining after the infra-red is turned off, are not freshly created but rather are freshly liberated.

Regardless of the way in which the P.I.P was established, our theory holds that the resultant form of the stored data is the same. It can be recalled by any of the methods described below.

Recall of the recorded items of data is accomplished by the step of sensing the variations in the degree of persistent internal polarization or other characteristics of the P.I.P. in the elemental areas of the storage layer in any desired sequence, which may be the same as or different from the sequence in which the areas of polarization were induced.

VI. *Recall by neutralization of persistent internal polarization*

In order to sense the amount of P.I.P. in each elemental area of the layer, according to one aspect of the method described, these areas are scanned in any desired sequence by a suitable beam of energy in the absence of any externally applied electric field so as to release or neutralize the internal polarization, and the change in voltage appearing at the opposite surfaces of the layer as a result of the release of internal polarization is measured.

VII. *Recall by capacitance variation*

Alternatively, the amount of internal polarization is measured without releasing it, for example by varying a capacitance adjacent each elemental area and measuring the amount of charge induced therein by virtue of the internal polarization in the layer at that area. According to this latter aspect of the method and apparatus described, the internal polarization is measured by means of capacitance probes scanned past the layer and the voltage appearing as a result of the scanning is used as desired, for example, it may be measured by means of a suitable meter.

VIII. *Repeated recall*

Advantageously, the stored information is repeatedly recalled by partially neutralizing the P.I.P. at each recall. The capacitance variation recall method can be used to recall the stored data as often as desired without producing any release of the P.I.P.

IX. *Recall by neutralization of P.I.P. with reversed field applied*

In certain instances it is advantageous to increase the output voltage signal during recall by applying a reversed field as the P.I.P. is neutralized by an incident beam of energy.

In the following consideration of the method and apparatus described it cannot be emphasized too strongly that the method and apparatus of persistent internal polarization are entirely different in concept, arrangement, and operation from the types of systems wherein electrostatic charges are built up at the surfaces of insulating materials.

The present methods and apparatus are entirely different in concept, arrangement and operation from the electret types of systems in which an electric field is applied across a more or less molten sample of material in order to orient the electric dipoles in the material as permitted by the semi-melted condition of the heated sample.

Referring now to Figure 1, the method and apparatus embodying the present invention is described for the recording, storage and recall of data. In Figure 1 there is indicated schematically a cathode ray type of tube 10, the general construction and operation of which is well known and will not therefore be described in great detail. It is sufficient to say that the tube comprises an evacuated envelope 12, a thermionically emitting cathode 14, a control grid 16, a first anode 18, a second or high potential anode 20, and horizontal and vertical deflecting coils indicated schematically at 22 and 24, respectively.

Located internally of the evacuated envelope 12 near the anode 20 is a laminated data storage structure 26 placed oblique, preferably perpendicular, to the path of the cathode ray beam, indicated generally at 28. It will, of course, be understood that the path of the cathode ray beam will trace out a raster on the laminated structure 26 when appropriate deflecting currents from the terminals 31 and 32 of a sweep generator source 34 are used to energize the horizontal and vertical deflecting coils 22 and 24, respectively. As described in this embodiment, the raster is similar to that traced by a cathode ray beam in a television tube, although any other suitable raster may be employed.

The laminated structure 26 comprises three layers. The central layer 30 is a polarizable ZnS–CdS phosphor, such as that described above. The two outer layers of the laminated structure 26 are electrically conductive electrodes, which may be in the form of sheets of conductive material placed adjacent the opposite faces of the layer 30. The first of these electrodes 36 is arranged to be transparent to the beam of incident energy. As here shown, the electrode 36 is a fine screen. The second electrode is shown as being the anode 20, which, for example may be an aluminized coating on the inside of the face of the tube. Alternatively, the second electrode may be separate from the anode 20. The electrodes 36 and 20 serve as means for applying an electric field transversely through the layer 30. These electrodes are energized by a controllable external source of voltage indicated schematically at 38. To apply the electric field across the polarizable material in middle layer 30, a three pole, three position switch, generally indicated at 40, is thrown into its left or "Record" position. The center and right switch arms 42 and 44 engage the contacts 46 and 48, respectively, and apply the voltage from the source 38 between the screen electrode 36 and the anode 20. For example, this may be 300 volts, with the anode 20 being positive with respect to the screen. The left switch arm 50 engages the contact 52 to apply anode voltage from a terminal 54 of an anode voltage source 56 to the anode 20. The first anode 18 is energized from the terminal 58 of the source 56. An isolating resistor 55 is in the lead 53 between terminal 54 and contact 52.

A characteristic of the items of data to be recorded, for example, the varying numerical magnitude of the items, is generated as a varying voltage by a suitable data signal source indicated diagrammatically in block form at 60. The voltage representative of the characteristic of the items of data to be recorded is fed through a switch 62 and a lead 63 and across a resistor 64 to be applied as a varying bias voltage for the grid 16 to modulate the intensity of the cathode ray beam emitted from the heated cathode 14 (method I A). Being thus proportional to the bias voltage from source 60 which is in turn proportional to the characteristic of the items of data to be recorded, the intensity of radiation (i.e. of the beam 28) incident upon the elemental areas of the phosphor layer 30 is therefore proportional to the characteristic of the items of data to be recorded. The deflection of the beam across the layer is performed in a suitable timed relation to the frequency of the varying voltage applied to the grid 16 which results in varying quantities of radiation being incident upon each of the elemental areas of the layer 30. These varying quantities of radiation being incident upon the elemental areas of the phosphor layer 30 while it is subject to an electric field applied from the battery 38 establish varying amounts of persistent internal polarization potentials in the phosphor layer.

Alternatively, the beam 28 may be varied in energy level according to the signals from the source 60 (method I B). To do this, the switch 62 is put in its intermediate position, and the voltage from the source 60 is then applied through a lead 65 across a resistor 66 to a control terminal 68 of the controllable anode voltage source 56. Thus, the voltages of the first and second anodes 18 and 20 are varied to vary the energy level of the beam to establish varying amounts of P.I.P. in the elemental areas of the layer 30. Both methods I A and I B can be used simultaneously by connecting the leads 63 and 65.

In order to vary the electric field between the electrodes 36 and 20 in accordance with the signals from the source 60 (method II), the switch 62 is moved to its lower position so that the output terminal 61 of the source 60 is connected through a lead 69 and across a resistor 70 and through a lead 72 to a control terminal 74 of the controllable source 38. Thus, in the various incremental areas of the layer 30 varying degrees of P.I.P. are established in accordance with the characteristics of the items of data to be recorded. The methods I A, I B, and II can be used simultaneously by interconnecting the leads 63, 65, and 69, or in various combinations.

In order best to preserve and store the recorded data, the switch 40 is moved to its middle or "store" position. The arm 50 connects the anode 20 to a contact 76 connected to the common return circuit or "ground." And the switch arms 42 and 44 interconnect the electrodes 36 and 20. This grounding of the electrodes 20 and 36 is for the purpose of removing all external field, which is the best condition for preserving the P.I.P. Moreover, we have found that during recording, in addition to the desired P.I.P., some free charges appear at the surfaces of the storage layer 30 against the electrodes. These surface charges are undesirable because of their tendency to leak away during the initial storage period and thus to mask and distort the recorded information, which is desirably to be stored as P.I.P. This surface charge usually amounts to about 10% of the effective charge due to the persistent internal polarization.

Interconnecting the electrodes 20 and 36 desirably removes all of the surface charge, leaving the P.I.P. and blocking any external field. The layer 30 is also protected from incident radiation, i.e. as here shown the cathode beam is shut off. When isolated in this manner, the layer 30 will retain its P.I.P. for long periods of time without significant deterioration.

To recall the recorded data from the layer 20, means are provided for sensing the P.I.P. established in this layer during the recording process. These means comprise the cathode ray tube 10 and an amplifier 78 coupled to a device indicated diagrammatically at 80 which has suitable voltage indicating, or other, utilization circuits. During this recall or "read out" of the stored information, the switch 40 is moved to its right, or "recall" position, so that the anode electrode 20 is connected through the switch arm 50 to the contact 82 and is coupled through a condenser 84 to the grounded input terminal 86 of the amplifier 78. The contact 82 is also connected to the anode voltage source 54. The electrode 36 is connected through the arm 42 and a contact 88 to the other input terminal 90 of the amplifier 78, and if desired, a reverse field is applied from a source 91 through an isolating resistor 92 by closing a switch 93. The amplifier output is fed to the utilization circuit 80. For recall the grid 16 is connected via the switch 62 to the source 60, and is operated with a constant bias to effect a constant intensity and energy level of the cathode ray beam.

As the cathode ray beam 28 is deflected across the layer 30 and in the absence of the electrostatic field applied by the source 38 during the recording process, the P.I.P. in the elemental areas of the layer 30 are neutralized and are manifested as voltages appearing between the electrodes 20 and 36 which are then amplified by the amplifier 78 and fed to the utilization circuit 80.

Instead of storing the data, the switch 40 can be swung to recall position immediately after storage and the information recalled at once, if desired.

Figure 2:
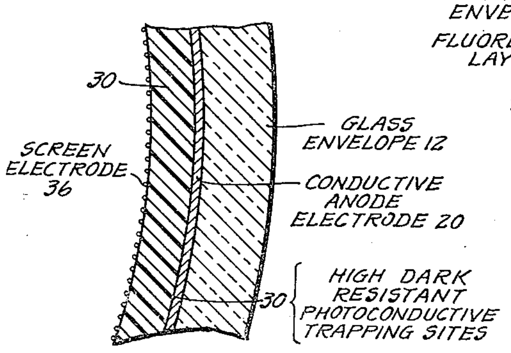
Figure 2 is a sectional view, on enlarged scale, showing a portion of the material which is subject to persistent internal polarization between two conductive layers, as it is used in the method and apparatus shown in Figure 1.

Figure 2 shows an enlarged cross section of the storage layer 26, with certain dimensions relatively enlarged to show more clearly the structure. The screen electrode 36 contacts the inner face of the polarizable layer 30 which in turn contacts the conductive film 20 on the inside surface of the glass 12.

A variation of the embodiment of Figure 1 is shown in Figure 3, in which elements performing functions corresponding to those in Figures 1 and 2 have corresponding reference numerals followed by the suffix "*a*." As stated above a wide variety of electromagnetic radiation is effective to produce polarization potentials in the storage layer. For example, an ion beam could be used in place of the cathode ray beam, but whatever the type of radiation, the electrode 36 or **36*a* adjacent the face of the layer 30 or 30*a*** on which the radiation is incident must be transparent to the radiation used.

As illustrated in Figure 3 the layer **30*a* is outside of the glass 12*a* and the electrodes 36*a* and 96 are in contact with the inner and outer surfaces of the layer 30*a*, respectively. There is also indicated a layer of fluorescent material 98 adjacent the anode 20*a*. Layer 98 emits visible light under the influence of the beam 28. In this embodiment it is not necessary that the electrode 36*a* be transparent to the initial beam of energy 28 but only be transparent to the radiation emitted by the fluorescent layer 98 when excited by the beam 28. Also, the anode 20*a* must be transparent to the radiation from the layer 98. This embodiment permits a greater variety of materials and types of radiation to be used while obtaining the same results. The structure illustrated in Figure 3 has the additional advantage that the electrodes 36*a* and 96 and the layer 30*a* may be located outside the evacuated tube 1**.

The tube 10, for example, may also be an X-ray generating tube with the layer 98 comprising a target for generating X-rays used to excite the storage layer **30*a***.

Among the many advantages of having the storage sandwich comprising electrodes **36*a* and 96 and the polarizable substance 30*a* between them placed outside of the tube is that this sandwich can then readily be handled in the manner of a photographic plate. Thus, a single tube 10 can be used to record on or read from large numbers of replaceable plates, which are stored away when not in use. It is important that the two electrodes 36*a* and 96 make good contact with the opposed surfaces of the storage layer 30*a***. Thus, we prefer to have the replaceable plate comprise three layers, as shown.

Where the outer face of the tube 10 is coated with a conductive substance to form a layer **36*a*, then the replaceable plate may comprise only the storage layer 30*a* and the electrode 96, providing clamping means are used to assure a good contact between layers 30*a* and 36*a***.

Figure 3*a* shows a modified plate in which the fluorescent source layer 98 of exciting energy is included in the sandwich adjacent one of the electrodes **36*a***, which is transparent to the radiation therefrom, e.g. gold foil, tin oxide coated glass.

In Figure 4 is shown another embodiment of the present invention which takes the form, generally, of a tape recorder schematically illustrated. The supply and take-up reels 100 and 102 are driven by any suitable means and the flexible tape medium 104 is fed from one to the other at constant speed by means of a capstan roller 106 turning uniformly. Portions of the apparatus in Figure 4 performing functions corresponding to those in Figures 1–3 have corresponding reference numerals followed by the suffix "*b*." The tape 104 forms a storage matrix and includes a flexible backing 108 (see also Figure 5), such as paper, plastic, aluminum foil, or may be of any suitable material for carrying a thin storage layer **30*b*, for example, of ZnS-CdS phosphor uniformly dispersed in a suitable ground material. The backing 108 may advantageously be electrically conductive. Thus, when wound up in a reel it serves as a grounded electrode adjacent both faces of the storage layer, thus blanking out any external field from layer to layer. The tape carrying the storage layer is run between electrodes 110 and 112 which are connected to a suitable source of potential 38*b* to establish an electrostatic field in that portion of the phosphor layer 30*b* between the plates at any given instant. There is also provided a source of radiation of any desired type, for example, such as a heated filament 14*b*. A suitable optical system 116 is used for focusing the radiation on an elemental area of the phosphor layer passing between the electrodes 110 and 112. Means are indicated at 18*b*, for example, such as a shutter or Kerr cell, for modulating the intensity of the radiation in accordance with the characteristics of the items of data being recorded, as controlled by signals from the data signal source 60*b*. As in the case of the embodiment of Figure 1, the amount of P.I.P. induced in the layer is a function of the product of the radiation intensity, energy level of the radiation, and of the electric field established between the electrodes 110 and 112**, and any or all of these may be varied, if desired, during the recording, as will be understood from the above detailed description of Figure 1. Only means for modulating radiation intensity are shown, to simplify the drawing.

If desired, the storage layer on the tape may be divided into conductively isolated elemental areas by spaced insulation strips 105 cutting across the layer **30*b* as illustrated in Figure 6. Recall of the data recorded on the tape may be accomplished with a pair of capacitive probes 120 and 122 adjacent opposite sides of the tape 104. These probes are connected to a suitable amplifier and indicating or utilization devices 124. The variations in P.I.P. now induce varying charges on the probes in proportion to the various amounts of polarization in the layer 30*b*. As in the case of the embodiment of Figure 1, the potentials from the probes 120 and 122** may be used in any desired manner in connection with control devices or the like.

Among the advantages of this latter method and apparatus is that the internal polarization is not discharged during the "recall." However, where desired, a discharging beam of energy may be used with the recall electrodes 120 and 122. Moreover, multiple probes in banks and multiple radiation sources can be used for creating one or more tracks of recorded information in the tape 104, or multiple radiation sources can be used alone for creating the tracks of recorded information. Also variations in the width or position on the tape of the recorded track or tracks can be used for recording multiple items of information simultaneously.

Instead of the ZnS-CdS phosphor and anthracene discussed above, we have found that the following photoconductive substances can be advantageously used, in certain instances, to form the layer 30, 30*a*, or 30*b*: chrysene, 9-bromoanthracene, and trans-stilbene, and methyl chloranthrene.

Our present theory for explaining the internal phenomena occurring during the inducement of storage, and discharge of the persistent internal polarization is as follows: These photoconductive or electroluminescent substances have a high dark resistance, in other words, in the absence of any excitation there are very few mobile charges in the body of the substance. The mobile charges may be electrons which have been excited into the so-called conduction band of energy or they may be "holes" or both. "Holes" in semi-conductors are described by William Shockley in the book "Electrons and Holes in Semi-Conductors." These substances also have numerous "trapping sites" in them in which conduction electrons or holes become trapped and from which the mobile charges can again become freed only by the subsequent excitation by application of energy in some form. It may be convenient to think of these trapping sites as potential "wells" into which the mobile charges "fall." We now believe that these wells are of different "depths," that is, some electrons or holes become more firmly trapped in some trapping sites than others and consequently require greater amounts of energy to liberate them again from the traps.

When the photoconductive or electroluminescent material is excited, large numbers of electrons are raised into the conduction band and large numbers of holes are created, or large numbers of electrons are raised into the conduction band or large numbers of holes are created, and these then begin to migrate or drift, the electrons in one direction, the holes in the opposite, both under the influence of the electric field applied by the opposed pairs of electrodes 36—20, 36*a*—96, 110—112, as the case may be. Large numbers of these migrating charges are caught in these trapping sites. When the excitation and field are removed, these electrons and holes remain trapped in these sites, or electrons, or holes remain trapped therein. They are now trapped at positions which are displaced in the respective directions of migration from the positions which they occupied originally when the substance was unpolarized.

As a result of these displaced charges trapped in the body of the material, a potential gradient now exists within and across the material. This potential gradient we call a persistent internal polarization; it is entirely different in concept and effect from the potential gradient established by electrostatic charges built up on the surface of an insulator. It is important that both positive and negative charges be localized, because if either type is free to migrate, they will drift under the influence of the internal field and quickly neutralize the trapped charges.

The numbers of electrons and holes becoming trapped in this fashion is a function of both the intensity and energy level of the incident radiation, both of which control the numbers of conduction electrons that are generated by the radiation; and also is a function of the electric field, which governs how fast the mobile charges migrate once they are created. Presumably, the more mobile charges there are and the faster they migrate, the greater is the resulting number of trapped charges and the further they have been displaced. Thus, a greater amount of polarization persists after the radiation and field have been removed.

By storing the material as described, the charges remained trapped and so the internal polarization remains.

In the above method and apparatus, it is not necessary that the electric field be applied simultaneously with the excitation. It is necessary only that the field be applied sufficiently soon after the excitation ceases so that a significant number of mobile charges are still existent within the material which can be caused to migrate and become trapped, i.e. "dark" polarization.

We have found that in many cases infra-red radiation liberates the trapped charges without creating significant numbers of new mobile charges. That is why infra-red is used during conversion of "latent" to true polarization.

Some few of the trapped charges during storage apparently escape from some of the weak (or shallow) trapping sites, causing a slight deterioration or reduction in the amount of polarization which persists, but over reasonably long periods of time the desired data is stored without significant deterioration.

Advantageously, to clear out the shallow traps, a weak infra-red beam may be used immediately after recording, then only the deeply trapped charges remain and no further significant decay occurs.

When the recall method of Figure 1 or of Figure 4 is used, the incident radiation applied in the absence of the field excites many of the trapped charges to free them, or the incident radiation does both functions—freeing the trapped charges and creating new mobile charges. And in the absence of any applied field, all of these mobile charges drift under the influence of the internal field so as to neutralize the polarization. This neutralization of the polarization causes a drop in the potential gradient across the material and hence induces a change in the voltage at the electrodes against opposite faces of the material. The greater was the degree of polarization, the greater is the voltage change induced between the electrodes 36 and 20, or 36*a* and 96, as the case may be.

We find that with the use of the du Pont phosphor 1508 about 20% of the P.I.P. disappears within the period from 5 minutes to 72 hours after recording, due to release of charges from shallow traps. By using long wavelength infra-red initially to clean out the shallow traps, which removes about 20 to 40% of the total P.I.P. in the 1508 material, then substantially no further decay occurs. At least 50% of the total initial P.I.P. is present one month later.

Anthracene advantageously appears from our experiments to have only deep trapping sites and exhibits only very small amounts of decay of the P.I.P.

It is important to note that with P.I.P. it is possible even to apply reversed fields which are stronger than the field used during recording and these reversed fields will cause substantially no reduction in the amount of P.I.P. which is exhibited, e.g. with a recording field of 200 v. and a reversed field of 300 v.

The method and apparatus of Figure 7 is interesting in that they increase the output signal from the polarized layer by reducing the effective shunt capacity and by applying a reversed field during recall to boost the output signal.

Figure 7 is similar to Figures 1 and 4 in certain regards and components performing functions corresponding to those of Figures 1 and 4 have corresponding reference numerals, followed by the suffix "*c*."

In order to reduce the shunt capacitance between the electrodes 20 and 36 of Figure 1, the beam-energy transparent electrode is divided into a series of long thin strips 36–1, 36–2, 36–3, etc., and the electrode 20*c* remains continuous. The intermediate storage layer may also remain continuous, or it can be divided into a series of strips 30–1, 30–2, 30–3, etc. By this subdivision we reduce the capacitance between the opposed electrodes to a value about the same as that of the input circuits to the amplifier. For example, where 20 strips are used the input signal becomes about 20 times larger by virtue of the shunt capacitance reduction.

These strips of storage material are scanned longitudinally and each includes a multitude of elemental areas. For example, where 20 strips are used across the face of the tube 10, each may include about 25 horizontal scanning lines, and each line may include several hundred recording areas.

The electrodes 36–1, 36–2, etc. are connected through a multiple pole double throw switch 130 which is ganged with the main switch 40*c* so as to remain in its lower position while the switch 40*c* is in either "record" or "recall" position, for example, by means of a cam 133 which lifts up the control element 135 for the arms of the switch 130 which is spring biased toward its lower position. Thus, during recording and storage all of the electrodes 36–1, 36–2, etc. are connected together through the contacts 132–1, 132–2, etc. and the lead 134 which connects with the lead 41*c*. Thus, these electrode strips act like a single electrode. However, during recall they are individually connected through the contacts 136–1, 136–2, 136–3, etc. with cathode-follower isolation stages 138–1, 138–2, etc., which are connected through electronic switches 140–1, 140–2, 140–3, etc. and through a lead 89*c* to the input terminal 90*c* of an amplifier 78*c*, connected to the utilization circuits 80*c*.

As long as the electron beam is scanning the storage layer 30–1 the electronic switch 140–1 is closed and the others are open. When the beam begins scanning layer 30–2, then the switch 140–2 is closed and the others are open, and so forth. To control the operation of the switches, their control terminals 142 are all connected through a lead 144 to the vertical sweep control terminal 32. The individual switches 140 thus are biased to operate in successive ranges of the vertical sweep voltage.

In order to provide a reverse voltage during recall, which we find tends further to boost the output signal, a voltage dropping resistor 146 and a voltage regulator tube 148 are connected in series between the B+ plate supply source for the cathode follower stages and the common return circuit ("ground"). The grid return resistors 150 and the cathode load resistors 152 are connected to the junction of the resistor 146 and the VR tube 148. Thus, all of the electrodes 36–1, 36–2, etc. are biased positively with respect to the electrode 20, to apply a reversed field.

The remainder of the circuit of Figure 7 is like Figure 1 as indicated by the connections, and the switch 40*c* operates like the switch 40.

In the circuit of Figure 8, parts performing functions corresponding to those in circuits described above have corresponding reference numerals with a suffix "*d*." To isolate the electrodes 36–1, 36–2, etc. from each other, rectifiers 160–1, 160–2, etc. are used, connected together through a cathode follower 162, whose load resistor 164 is connected through a lead 89*d* to the amplifier 78*d*.

A very surprising and important advantage of the present invention is illustrated in Figures 9–12. It is the actual increase in dielectric constant associated with persistent internal polarization and the fact that the output voltage during neutralization of the P.I.P. may actually be much greater than the voltage used during recording. For example, as shown in Figure 9, with SW1 closed a 200 v. source $V_s$ is applied to the two electrodes 20 and 36. In the absence of any excitation the storage layer 20, such as ZnS-CdS phosphor or anthracene, exhibits a certain dielectric constant "*e*," and the condenser will receive a certain charge "Q" in accordance with the formula, where "C" is the air capacity:

(1) $$Q=eCV_s$$

But, when excitation energy is applied, mobile charges are created and migrate under the influence of the field $V_s$ applied, and become trapped. Thus, the positive charges are brought much closer to the negative electrode 36, and the negative ones closer to the positive electrode 20. This enables a far greater charge to be placed on the condenser. The capacitance is markedly raised. The capacitance increase effect is in the nature of what occurs in an air condenser when the plates are moved closer together. But, instead of moving the electrodes, the internal charges are shifted. Thus, the effective dielectric constant "*e*" is increased and so is the total charge "Q′."

(2) $$Q'=e'CV_s$$

Then the image charge is allowed to appear on the electrodes, and any surface charges on the layer 30 and the external field are removed by closing SW2 with SW1 opened and with all excitation removed. The internal polarization persists. The image charge which appears on the electrodes neutralizes the external field.

As shown in Figure 11, when SW2 is opened and when excitation is used to neutralize partially the internally trapped charges, the external field reappears, now due solely to the excess of image charges on the electrodes which remain when the P.I.P. is partially neutralized. The reason that the P.I.P. is not completely neutralized is that the image charges on the electrodes cancels the internal field, and this maintains the polarization in spite of the neutralizing effect of the excitation energy applied. This external field "$V_2$" is not now so large as the applied field when equilibrium is reached.

As shown in Figure 12, when neutralization is completed with one of the electrodes lifted away from the storage layer therebetween and the electrode thereafter is replaced, the induced voltage at the electrodes jumps suddenly to a value usually far in excess of the initially applied voltage, of the order of 600% of it.

Our theory for explaining this is that the reapplication of excitation energy, creating new mobile charges which neutralize the P.I.P., in effect suddenly reduces the dielectric constant back to its initial value "*e*" so that the large charge "Q′" causes a larger electrode voltage "$V_3$" to appear.

(3) $$V_3=\frac{Q'}{eC}$$

Thus, (4) $$V_3>V_s$$

Where a reverse field is applied during recall, the output voltage $V_3$ is even further enlarged.

Referring again to Figure 1, in operating the tube 10 during recording it is advisable to use a relatively large anode voltage for accelerating the electron beam 28 and to use a relatively large beam current, for example such as an accelerating voltage of about 10,000 volts with a beam current of about 1 microampere. Preferably the electron beam is operated at least with a sufficiently high accelerating voltage that the electrons strike the sandwich 26 with energies above the second cross over point for secondary emission, i.e. so that fewer secondary electrons are created than primary electrons. For certain applications a lower accelerating voltage may satisfactorily be used, but generally it is advisable to operate the apparatus of Figure 1 above the second cross over point. A unidirectional field through the storage layer 30 of about 200 volts during recording is highly satisfactory. For recording by methods II or III above, the unidirectional field may advantageously be turned on and off for yes-no type recording. Alternatively, it may be varied in the range from about 50 volts to about 400 volts for producing graduations in intensities of the P.I.P.

During recall, the apparatus of Figure 1 is preferably operated with an accelerating voltage at least as large as was used during recording, although for certain applications a lesser voltage may be used. During recall the beam current is preferably only a small fraction of that which was used during recording, for example a beam current in the range from about 1/10 to about 1/100 magnitude of the beam current used during recording is quite satisfactory for recall. Where repeated recall is desired, relatively smaller beam currents are used during each recall, i.e. in the range from about 1/100 to about 1/1000 of the recording beam current.

For recording by latent polarizability (method V) we find it advantageous to use a burst of infra-red radiation having a wavelength in the range from about 8,000 to about 15,000 angstroms during the conversion from latent polarizability to true polarization.

In addition to the four characteristics set forth above which define materials for use in the method and apparatus of the present invention, we find that in most instances it is more advantageous to use storage material which shows significant excitation by radiation of wavelengths longer than 2800 angstroms as well as substantial excitation by shorter wavelengths.

A striking demonstration of the storage of data by persistent internal polarization and one which is easily done is made by the following method and apparatus. Finely powdered Zns-Cds phosphor, such as "du Pont 1508," or anthracene, in a "Duco" cement binder is spread in a layer 1/10 millimeter thick to form a storage layer on a light transparent electrically conductive electrode, e.g. such as "Nesa" glass made by Pittsburgh Plate Glass Company. A sheet of ordinary glass with a tin oxide glass conductive coating on it is quite satisfactory. The other electrode is a sheet of aluminum foil ½ micron in thickness glued fixedly against the storage layer. A unidirectional voltage of 200 v. is impressed across the storage layer between the conductive glass and aluminum electrode with the glass electrode grounded and the aluminum electrode at negative potential with respect thereto.

While this field is applied, a thin beam of light is shown through the glass electrode onto the storage layer. This beam is scanned across the storage layer and turned on and off while being scanned, producing variations in the P.I.P. Thereafter, both the field and light are removed and the two electrodes are connected to each other and grounded.

For recall, the aluminum electrode is connected to an electrometer while the conductive glass electrode is grounded and the beam of light is turned on and scanned over the same areas of the storage layer. Those areas which were previously illuminated show large output voltages in the electrometer, those which were not, show substantially nothing.

From the above detailed description it will be understood by those skilled in the art how this demonstration apparatus is used to perform the other methods. For example, for "dark" polarization the 200 volt field is applied as soon as the beam scanning has been completed, and so forth.

The embodiments of our invention described above are solely for the purpose of illustration and are not to be construed as limiting the scope of the invention. Many variations of the details of the invention will be readily apparent to those skilled in the art. Therefore, the scope of our invention is defined only in the following claims.

We claim:

1. Data storage apparatus comprising a matrix of conductively isolated regions of internally polarizable material, electrically-conductive means in contact with opposite faces of said regions, a source of electricity coupled to said conductive means for establishing in said matrix an electric field, means for scanning each of said regions by a beam of energy, and means for varying the product of intensity and energy level of said beam and of said field during the scanning of each of said regions in accordance with characteristics of items of data to be stored, whereby a persistent internal polarization potential related to the characteristics is established in each of the regions of the matrix.

2. Data storage apparatus as claimed in claim 1 and wherein means are provided for sensing the internal polarization potential comprising means for scanning each of said regions by a beam of energy having constant intensity and energy level, electrically conductive means in contact with opposite faces of said regions, and means for detecting changes in potential between said last-said conductive means.

3. Data storage apparatus comprising a cathode ray tube, an extended layer of persistently internally polarizable material, said layer being located in the path of the beam of said tube, a pair of electrode means in direct contact with opposite faces of said layer and a source of potential connected in serial relation with said electrode means and the layer therebetween for establishing an electric field in said layer, means for deflecting the beam of said tube over a raster to irradiate successively a plurality of areas of said layer, and means positioned along the path of the beam before the beam reaches said layer for varying the characteristics of the beam of said tube in accordance with characteristics of items of data to be recorded.

4. The method of recording information by latent polarizability in persistently internally polarizable material of a type wherein both positive and negative charges can be localized, having high dark resistance, and having trapping sites therein, comprising the steps of: applying to a plurality of regions of said material excitation energy having characteristics corresponding to the information to be recorded, removing said excitation energy, and applying a unidirectional field through said regions while irradiating said regions with infra-red light in the absence of said excitation energy.

5. The method of recording and recalling information by latent polarizability in persistently internally polarizable material having high dark resistance of a type wherein both positive and negative charges can be localized, and having trapping sites therein comprising the steps of: applying to a plurality of portions of said material excitation energy having energy content characteristics corresponding to the information to be recorded, removing said excitation energy, thereafter applying unidirectional electric field through said regions while irradiating said regions with infra-red light in the absence of said excitation energy, and at least partially neutralizing the persistent internal polarization in each of said regions while sensing the voltage across respective ones of said regions as the persistent internal polarization therein is neutralized.

6. Apparatus for recording and recalling data comprising a first electrically conductive electrode, a plurality of regions including persistently internally polarizable material each directly engaging one face of said electrode, a second electrode comprising a plurality of electrically conductive elements insulated from each other, said second electrode directly engaging said regions on the opposite side from said first electrode, means for scanning each of said regions in sequence with a beam of energy, one of said electrodes being transparent to said beam, a source of electrical potential, utilization circuit means, and switch means coupled to each of said electrically conductive elements and having two operative conditions, said switch means in one operative condition connecting said elements together and to said source of potential for applying said source of potential across all of said regions, and in the other operative condition connecting said elements individually to said utilization circuit means.

7. The method of recording and recalling information in the form of variations in persistent internal polarization in various areas of persistently internally polarizable material having high dark resistance, having trapping sites therein for mobile charges, and capable of localizing both positive and negative charges therein comprising the steps of applying excitation energy to said areas, imposing an electric field across said areas, varying said electric field in accordance with the information to be recorded, thereby to create variations in the persistent internal polarization of said areas, and recalling said recorded information by again applying excitation energy to said areas, and sensing the variations in potential across said areas as said excitation energy is applied.

8. The method of recording and recalling information in the form of variations in persistent internal polarization in various areas of persistently internally polarizable material comprising the steps of applying excitation energy to said areas, imposing an electric field across said areas, varying the product of the strength of the electric field and the excitation energy applied to said areas, thereby to create variations in the persistent internal polarization of said areas, and recalling said recorded information by again applying excitation energy to said areas, imposing on said areas an electric field of reversed polarity from the electric field during recording and sensing the variations in potential appearing across said areas as said excitation energy is applied.

9. The method of recording, storing, and repeatedly recalling information in the form of variations in persistent internal polarization in regions including photoconductive material having high dark resistance and capable of localizing both positive and negative charges therein and having trapping sites therein for mobile charges comprising the steps of applying excitation energy in sequence to a plurality of regions of said material, imposing an electric field across said regions, and varying said electric field in accordance with the information to be recorded, thereby to record said information, storing the recorded information by removing the field and removing the excitation energy, and repeatedly recalling the information by repeatedly applying excitation energy to said regions partially to discharge the said internal polarization at each application, and sensing the variations in the potential across said regions upon each partial discharge of the internal polarization.

References Cited in the file of this patent

UNITED STATES PATENTS

| | | |
|---|---|---|
| 2,543,039 | McKay | Feb. 27, 1951 |
| 2,589,704 | Kirkpatrick et al. | Mar. 18, 1952 |
| 2,698,928 | Pulvari | Jan. 4, 1955 |
| 2,747,131 | Sheldon | May 22, 1956 |
| 2,747,132 | Sheldon | May 22, 1956 |

FOREIGN PATENTS

| | | |
|---|---|---|
| 692,337 | Great Britain | June 3, 1953 |